(12) United States Patent
Wargo

(10) Patent No.: US 11,835,170 B1
(45) Date of Patent: Dec. 5, 2023

(54) PIPE CLAMP FOR THE PROTECTION OF PIPING

(71) Applicant: Greg Wargo, Vineland, NJ (US)

(72) Inventor: Greg Wargo, Vineland, NJ (US)

( * ) Notice: Subject to any disclaimer, the term of this patent is extended or adjusted under 35 U.S.C. 154(b) by 0 days.

(21) Appl. No.: 17/807,916

(22) Filed: Jun. 21, 2022

(51) Int. Cl.
*F16L 59/135* (2006.01)
*F16L 59/14* (2006.01)
*B65D 63/00* (2006.01)

(52) U.S. Cl.
CPC ............ *F16L 59/135* (2013.01); *F16L 59/14* (2013.01); *B65D 63/00* (2013.01)

(58) Field of Classification Search
CPC ......... F16L 59/135; F16L 59/14; B65D 63/00
See application file for complete search history.

(56) References Cited

U.S. PATENT DOCUMENTS

| | | | | |
|---|---|---|---|---|
| 433,882 A * | 8/1890 | Belding | .................. | F16L 19/04 52/16 |
| 1,349,789 A * | 8/1920 | Schirra | .................. | F16L 57/005 102/528 |
| 2,714,395 A * | 8/1955 | Epstein | ..................... | F16L 7/00 126/307 R |
| 2,717,788 A * | 9/1955 | Raynes | .................. | F16L 23/08 285/411 |
| 3,189,961 A * | 6/1965 | Heller | .................... | F16L 33/035 24/20 CW |
| 3,219,368 A * | 11/1965 | Crumpler | ............. | E02B 11/005 405/47 |
| 3,523,337 A * | 8/1970 | Oetiker | .................. | B65D 63/08 24/20 CW |
| 3,602,954 A * | 9/1971 | Gerlach | ................ | F16L 33/025 24/20 CW |
| 3,635,506 A * | 1/1972 | Womble | .................. | F16L 23/08 285/411 |
| 4,402,113 A * | 9/1983 | Smith | ..................... | F16L 33/02 24/23 R |
| 4,609,171 A * | 9/1986 | Matsui | ..................... | H02G 3/32 248/316.1 |
| 4,744,535 A * | 5/1988 | Patenaude | ............. | F16L 3/1207 248/62 |
| 4,852,831 A * | 8/1989 | Sandstrom | ............ | F16L 59/135 285/47 |
| 4,907,319 A * | 3/1990 | Calmettes | ............. | F16L 33/035 24/20 R |
| 5,230,126 A * | 7/1993 | Oetiker | ................. | B25B 25/005 24/20 R |
| 5,530,996 A * | 7/1996 | Calmettes | ................. | F16B 2/08 24/20 R |

(Continued)

*Primary Examiner* — Nkeisha Smith
(74) *Attorney, Agent, or Firm* — Stuart M. Goldstein

(57) ABSTRACT

A pipe clamp has a continuously extending, circularly shaped resilient strip comprising a plurality of outwardly extending nub members. Each of the nub members is separated from each adjacent nub member by intervening pipe gripping sections. The clamp is configured to circumscribe and be compelled against the surface of the pipe by means of the spring like nature of the strip and attached to the pipe by end clips. When pipe insulation encircles the pipe and is positioned on the nub members, the pipe insulation is in spaced relation to the pipe surface and a vapor barrier is formed between the insulation and pipe surface. As insulation is never in contact with the surfaces of the pipe, any "pipe sweat" will not be absorbed by the insulation.

3 Claims, 4 Drawing Sheets

(56) References Cited

U.S. PATENT DOCUMENTS

| | | | | |
|---|---|---|---|---|
| 5,878,465 | A * | 3/1999 | Jenner | H02G 3/0468 |
| | | | | 24/271 |
| 6,126,119 | A * | 10/2000 | Giangrasso | F16L 55/035 |
| | | | | 248/74.1 |
| 6,349,748 | B1 * | 2/2002 | Dodds | F16L 59/135 |
| | | | | 138/112 |
| 6,880,789 | B2 * | 4/2005 | Benoit | F16L 3/127 |
| | | | | 248/74.2 |
| 7,168,452 | B2 * | 1/2007 | Sasaki | F16L 53/35 |
| | | | | 138/158 |
| 7,520,475 | B2 * | 4/2009 | Opperthauser | F16L 3/1211 |
| | | | | 248/74.1 |
| 8,015,672 | B2 * | 9/2011 | Ito | F16B 2/08 |
| | | | | 24/20 R |
| 8,713,763 | B2 * | 5/2014 | Koketsu | F16L 33/035 |
| | | | | 24/273 |
| 10,627,040 | B1 * | 4/2020 | Flynn | F16L 59/13 |
| 2021/0180739 | A1 * | 6/2021 | Dodge | F16L 59/135 |
| 2021/0231233 | A1 * | 7/2021 | Schutte | F16L 3/24 |
| 2021/0364120 | A1 * | 11/2021 | Palmer | F16L 59/135 |

* cited by examiner

PIPE CLAMP FOR THE PROTECTION OF PIPING

FIELD OF THE INVENTION

The present invention relates to the protection of insulated pipes from corrosion, deterioration, and ultimately failure, specifically by providing a uniquely designed pipe clamp.

BACKGROUND OF THE INVENTION

The use of pipe insulation is a common and necessary component in the plumbing trade, for H/VAC systems, and generally in the construction industry. Various types of insulation are routinely located around and in contact with pipes which are required to be insulated. However, insulated pipes will tend to sweat when there is a temperature change (product cooling or heating when not in use, outside temperature changes, etc.). When this happens, condensation is formed on the surface of the pipe. With nowhere else to go, this condensate moisture soaks into and becomes trapped in the insulation. The trapped moisture will actually cause the insulation to adhere to the piping like glue. Over time, the moisture laden insulation against the piping will cause the piping to rot and deteriorate. This developing situation will remain largely unnoticed, since the outer casing of insulation usually has a thin metal covering, like tin foil or heavy paper, which helps make it stronger. However, the metal covering also serves to hide the underlying pipe deterioration. As a result, such hidden damage in the piping will cause it to fail, without providing any warning.

SUMMARY OF THE INVENTION

It is thus the object of the present invention to provide a pipe clamp to be used on insulated pipes in order to prevent moisture build-up in the encircling insulation and hence damage to the piping.

This and other objects are accomplished by the present invention, a pipe clamp having a continuously extending, circularly shaped resilient strip comprising a plurality of outwardly extending nub members. Each of the nub members is separated from each adjacent nub member by intervening pipe gripping sections. The clamp is configured to circumscribe and be compelled against the surface of the pipe by means of the spring like nature of the strip and attached to the pipe by end clips. When pipe insulation encircles the pipe and is positioned on the nub members, the pipe insulation is in spaced relation to the pipe surface and a vapor barrier is formed between the insulation and pipe surface. As insulation is never in contact with the surfaces of the pipe, any "pipe sweat" will not be absorbed by the insulation.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
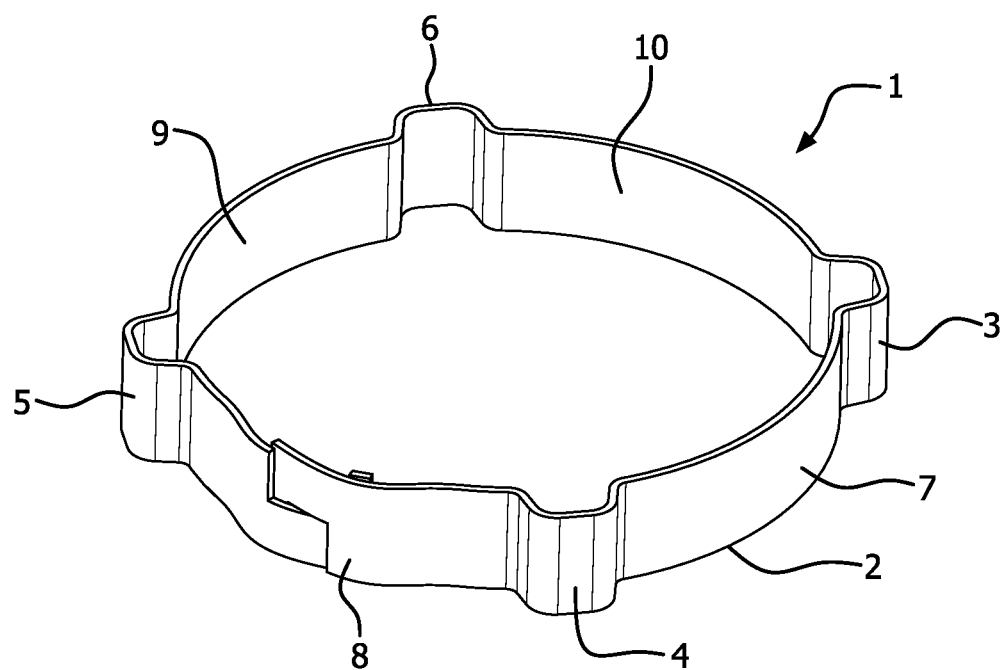
FIG. 1 is a perspective view of the pipe clamp of the present invention.
Figure 2:
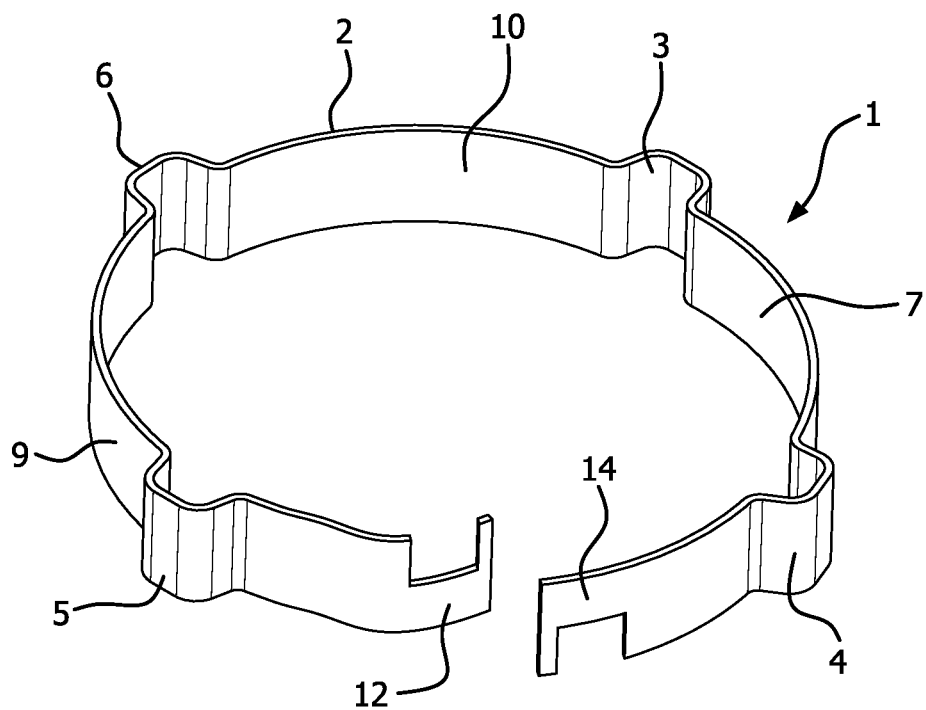
FIG. 2 is a perspective view of the pipe clamp of the present invention with its end clip s separated.

Pipe clamp 1 of the present invention comprises narrow, circularly shaped, continuous strip 2, fabricated of non-corrosive metal, hard plastic, or like resilient, spring-like material. Strip 2 is a single, continuous length band consisting of a plurality of outwardly extending nub members 3, 4, 5, and 6; each nub member being separated from each other by intervening, pipe gripping sections 7, 8, 9, and 10. It is contemplated that the number of nub members and intervening gripping sections will vary, according to the diameter of the pipe on which pipe clamp 1 is positioned. As a result, the present invention should not be considered restricted to the number of nub members and gripping sections disclosed herein. Attachment means in the form of clips 12 and 14 at the distal ends of band 2 serve to connect the ends of the band to close and complete its circular shape.

Figure 3:
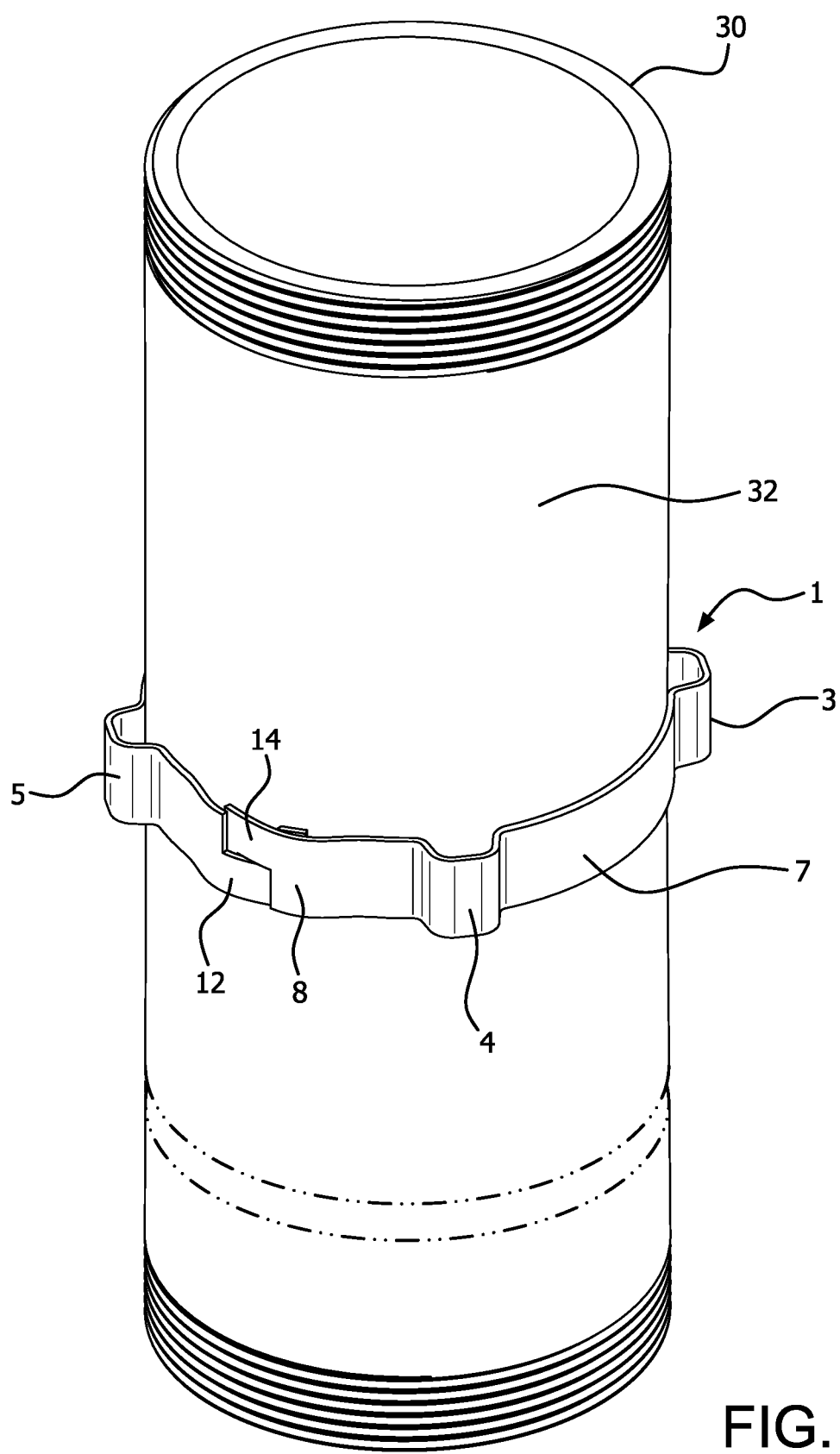
FIG. 3 shows the pipe clamp of the present invention encircling a pipe.
Figure 4:
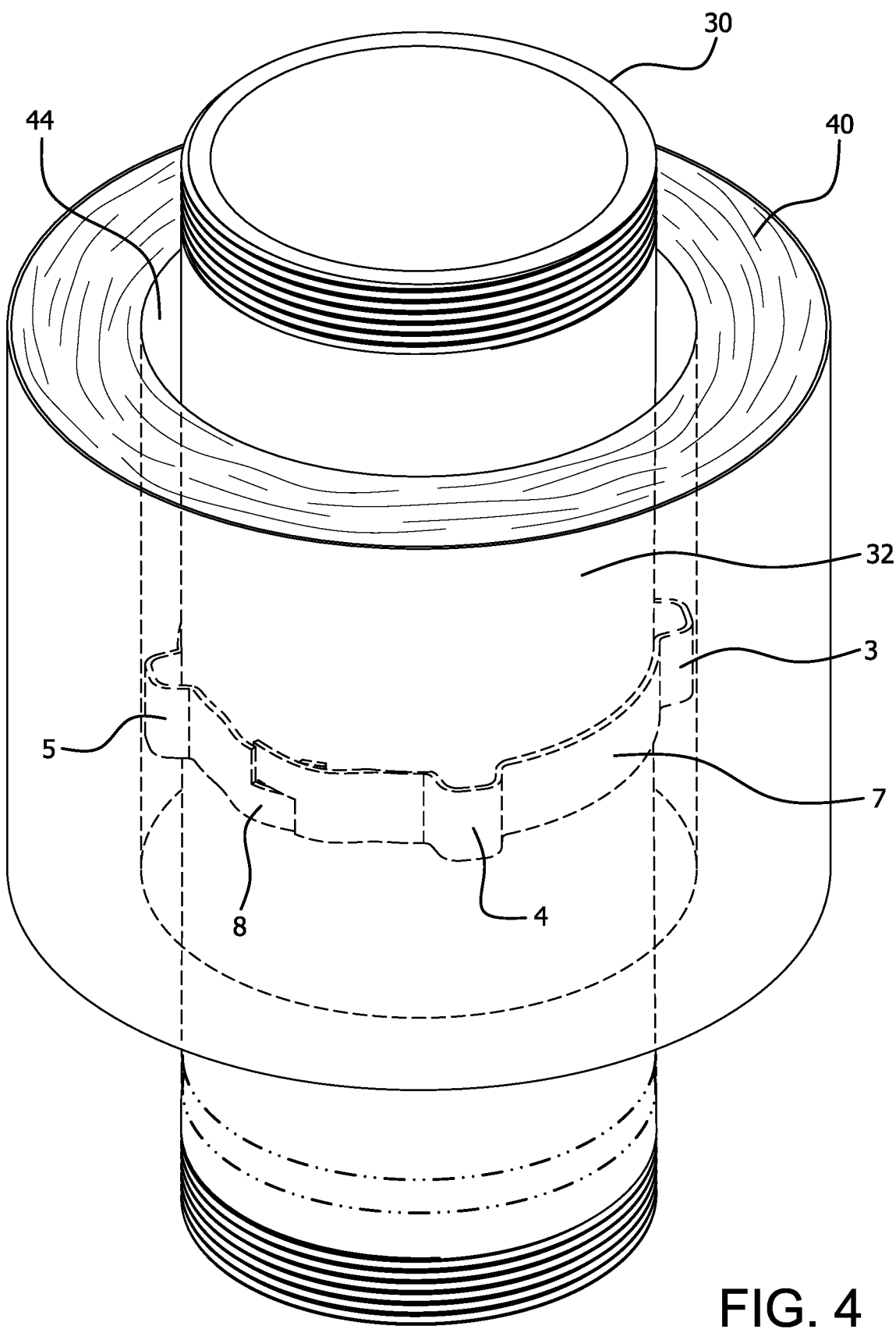
FIG. 4 shows pipe insulation encircling a pipe and being positioned on the nub members of the pipe clamp of the present invention.
Figure 5:
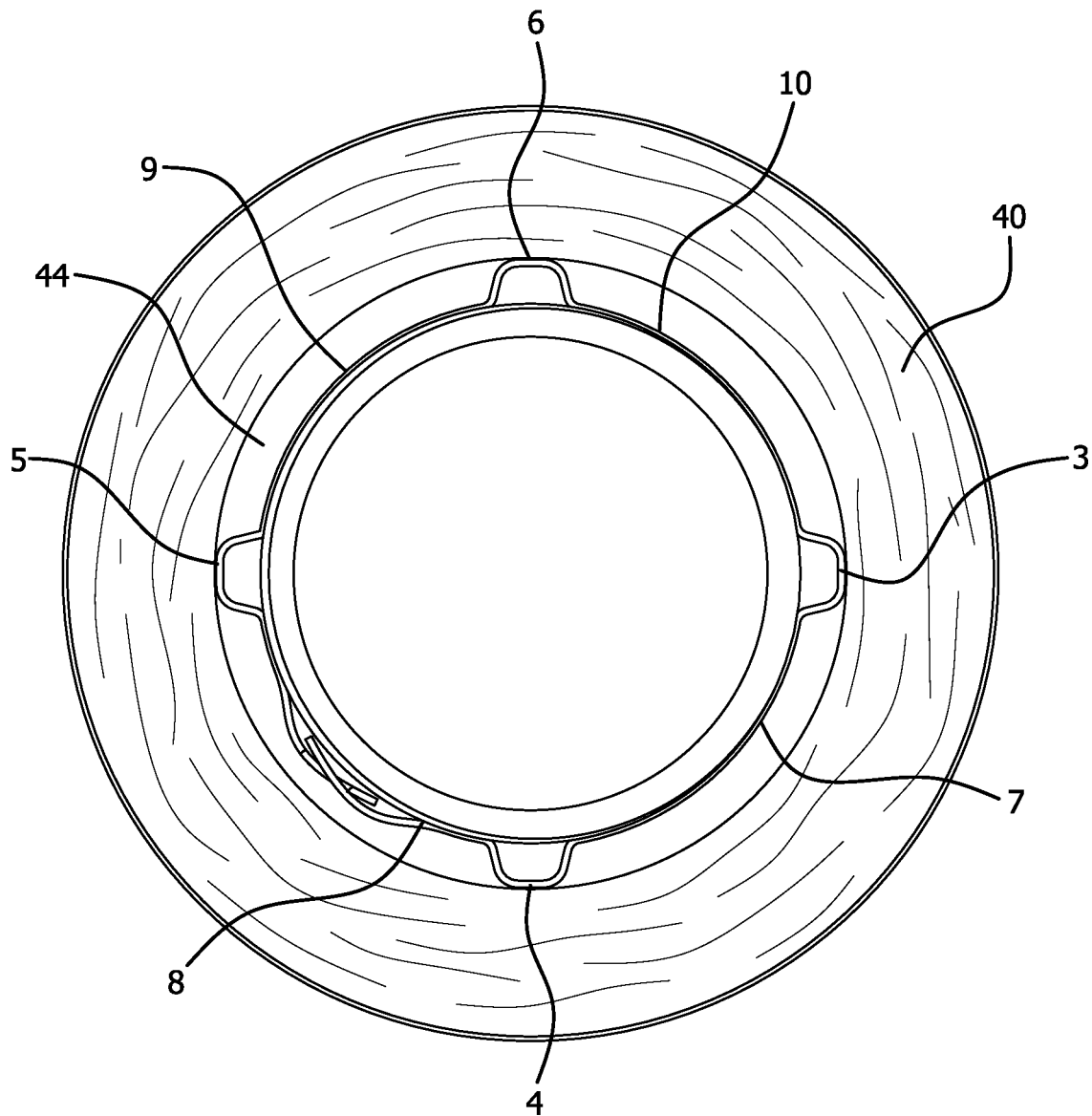
FIG. 5 is a top view of FIG. 4.

As best seen in FIGS. 3-5, clamp 1 is sized to surround pipe 30, such that pipe gripping sections 7-10 are in direct contact with pipe surface 32. Given the resiliency of band 2, clamp 1 is compelled against pipe surface 32, especially when clips 12 and 14 are connected. It is contemplated that the clamps of the invention are to be fabricated and sized of different lengths, so as to tightly fit around any diameter and type of pipe.

With pipe clamp 1 secured around pipe 30, pipe insulation 40 is positioned such that it encircles the pipe clamp with only nub members 3-6 of strip 2 in contact with the insulation (see FIGS. 4 and 5), thereby ensuring that the insulation is at all times in spaced relation to pipe surface 32. The result is that insulation 40 never physically contacts pipe surface 32, forming air gap or vapor barrier 44 between the insulation and the pipe surface. As a result of this spacing between insulation 40 and pipe 30, any condensation which develops on the pipe due to "pipe sweating" will not be absorbed by the insulation; thus preventing corrosion or rotting of the pipe due to contact with soaked insulation.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A system for protecting a pipe from sweat damage by forming and maintaining an air gap between the surface of a pipe and pipe insulation encircling the pipe, said system comprising:

a pipe clamp having a continuously extending, circularly shaped strip fabricated of resilient material, said pipe clamp consisting of a plurality of outwardly extending nub members and a plurality of intervening pipe gripping sections, each nub member separated from each adjacent nub member by one of the plurality of pipe gripping sections, each of the pipe gripping sections being in direct contact with the surface of the pipe, the clamp configured to circumscribe and be compelled against the surface of the pipe by the resiliency of the strip so as to provide attachment solely of the clamp to the pipe; and pipe insulation encircling the pipe and the clamp, the insulation being positioned on the nub members of the clamp in spaced relation to and never in physical contact with the pipe surface, wherein an air gap is formed and is maintained as an air gap between the insulation and pipe surface to protect the pipe from sweat damage.

2. The system as in claim 1 wherein the strip has distal ends, each distal end having attachment means for connecting the two distal ends; wherein when the clamp is circumscribed and compelled against the surface of the pipe and the ends of the strip are connected, the clamp is maintained tightly around the pipe.

3. The system as in claim 1 wherein the strip is a fabricated of a non-corrosive material.

\* \* \* \* \*